No. 627,413. Patented June 20, 1899.
W. HAMILTON.
TIRE TIGHTENER.
(Application filed Jan. 21, 1899.)
(No Model.) 2 Sheets—Sheet 1.
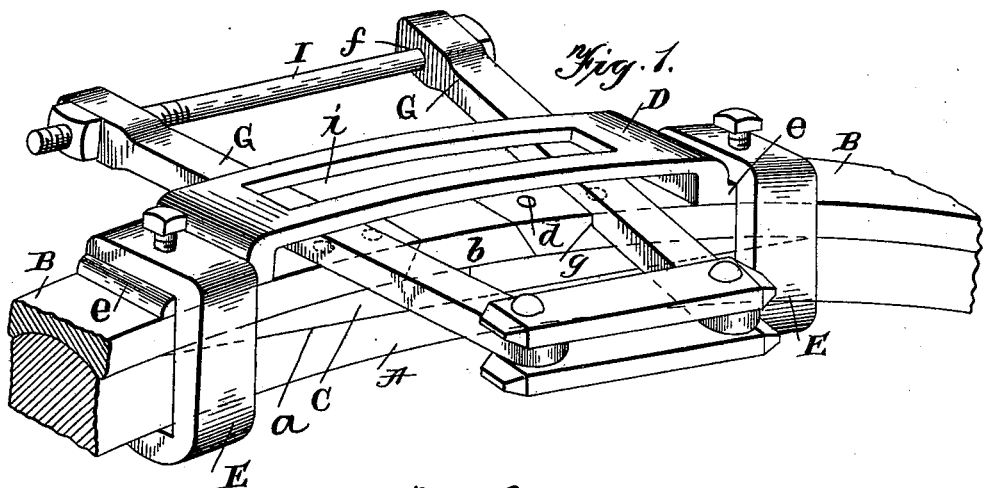
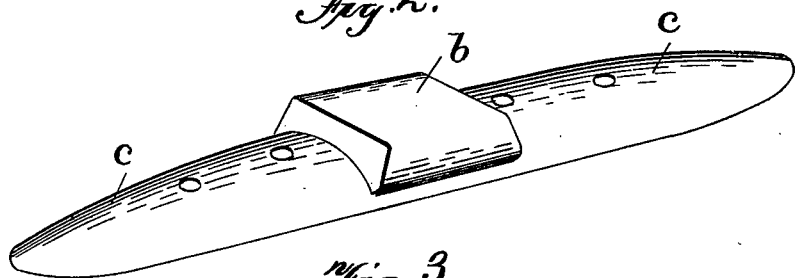
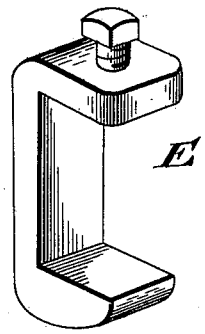
WITNESSES
Geo. E. Frech
Chas R Wright
INVENTOR
Washington Hamilton
by A. J. Pattison
Attorney No. 627,413. Patented June 20, 1899.
W. HAMILTON.
TIRE TIGHTENER.
(Application filed Jan. 21, 1899.)

(No Model.) 2 Sheets—Sheet 2.

WITNESSES
Geo. E. Fuch
Chas R. Wright Jr.

INVENTOR
Washington Hamilton
by A. S. Pattison
Attorney

THE NORRIS PETERS CO., PHOTO-LITHO., WASHINGTON, D. C.

United States Patent Office.

WASHINGTON HAMILTON, OF SHERIDAN, ILLINOIS.

TIRE-TIGHTENER.

SPECIFICATION forming part of Letters Patent No. 627,413, dated June 20, 1899.

Application filed January 21, 1899. Serial No. 702,962. (No model.)

*To all whom it may concern:*

Be it known that I, WASHINGTON HAMILTON, a citizen of the United States, residing at Sheridan, in the county of La Salle and State of Illinois, have invented new and useful Improvements in Tire-Tighteners, of which the following is a specification.

My invention relates to improvements in tire-tighteners, all of which will be described hereinafter and particularly referred to in the claims.

The object of my invention is to provide a device by means of which a tire can be readily tightened or loosened without heating the tire and which avoids the heating process, the latter being injurious to the felly of the wheel owing to the fact that the heated tire chars the periphery thereof, and on this account the tire becomes loose much quicker than if tightened by a cold method.

Figure 4:
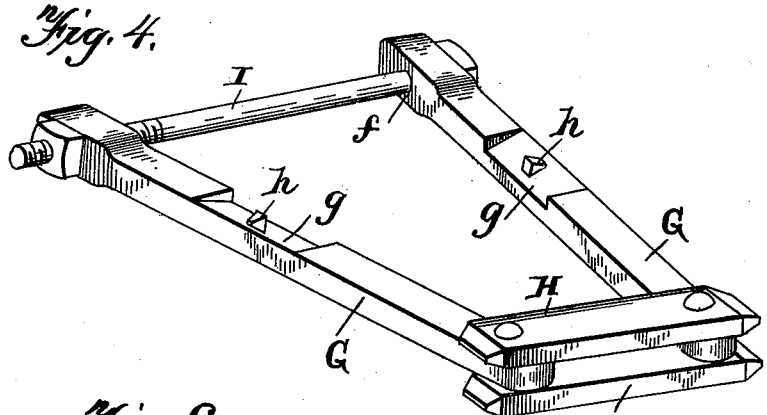
Figure 6:
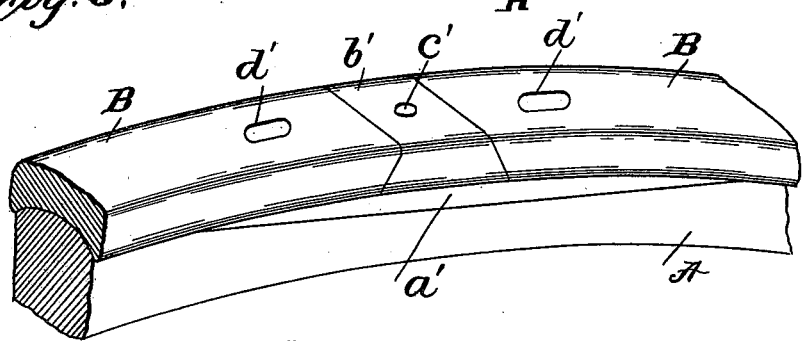
Figure 7:
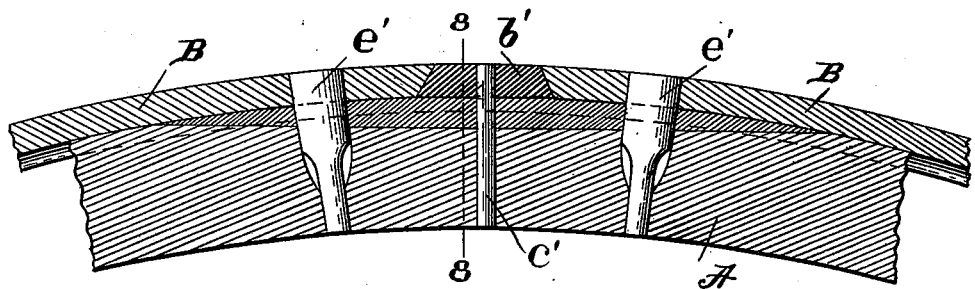
Figure 8:
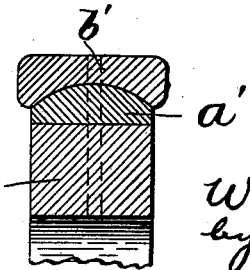

In the accompanying drawings, Figure 1 is a perspective view of my device, showing it in position for drawing the tire tight. Fig. 2 is a detached perspective view of the removable tire-plate. Fig. 3 is a detached view of the guide-plate. Fig. 4 is a detached view of the drawing-arm and its connection. Fig. 5 is a detached perspective view of one of the clamping-jaws. Fig. 6 is a perspective view of a modification of the felly-plate and its projection. Fig. 7 is a longitudinal sectional view of the same. Fig. 8 is a transverse sectional view on line 8 8 of Fig. 7.

Referring now to the drawings, A represents a felly, B a tire, which does not reach entirely around the felly, and C is a felly or tire plate which is situated between the ends of the tire and the periphery of the felly A, which is flattened, as shown at $a$, to receive the plate C, as illustrated. This plate C is provided with a central projection $b$, adapted to fit between the ends of the tire B and to form in practice a part of the tire between the ends thereof. This plate C has the tapered ends $c$, which are made to conform to the periphery of the felly A. The clamping-bolts $d$ pass through the ends of the tire and the felly and clamp the ends of the tire thereto.

My device for drawing the ends of the tire together and making it tight around the felly consist of a guide-plate D, which is essentially U-shaped, with the projecting ends $e$, the projecting ends in operation fitting against the outer side of the tire B, and the guide-plate is held to the outer face of the tire by means of the U-shaped clamps E, which have one jaw engaging the projections $e$ of the guide-plate D and the other jaw resting upon the inner side of the felly A, as clearly illustrated. The clamps E are not tightened sufficiently to hold the tire from slipping upon the felly, but only sufficiently to have the guide-plate C serve to hold the arms of the drawing device, which will now be described.

The drawing device consists of the two arms G, which are pivotally connected at one end between the links H and are provided at their outer ends with openings $f$, through which a screw-bolt I passes. The inner sides of these arms G are preferably recessed, as shown at $g$, which recesses receive the tire and serve as a guide for the arms in their drawing action. Projecting inward from these arms G, intermediate the ends of the recesses $g$, are the projections $h$, which are adapted to fit in the openings through which the outer bolts $d$ pass.

The guide-plate D is provided with a longitudinal slot $i$, which enables the inner bolts $d$ to be withdrawn therethrough.

When it is desired to apply the tire to a wheel, the projections $h$ of the arms G are inserted in the outer bolt-holes $d$, the bolts being first removed, and by turning the screw-bolt or the nuts thereon, as the case may be, the tire is drawn to relieve the strain upon the inner bolts $d$, which may be then readily removed through the slot $i$ of the guide-plate D. If it is desired to tighten the tire, the plate C is removed by loosening the tire and removing the drawing device and another plate put in its place with a shorter projection $b$, and by means of the drawing-arms G the ends of the tire are drawn tight and the clamping-bolt then passed therethrough, as will be readily understood. Should it be desired to loosen the tire, it can be loosened by applying the drawing device and removing the bolts and then loosening the tire.

By means of a device of this character if a wheel becomes swollen from being wet, as is frequently the case, the tire is readily loosened thereon to prevent injury to the wheel, and, on the other hand, if the tire becomes loose it is as readily tightened in the manner before explained.

I prefer to use a tire with an inner concaved surface and the felly with an outer convex surface; but my invention may be used in connection with a flat tire and felly as well and without departing from the spirit and scope of my invention.

In Figs. 6 and 7 I show a modification in respect to the felly-plate, wherein the plate $a'$ is provided with a detachable projection $b'$, the projection being held in place by means of a transverse bolt $c'$ passing through the projection, the felly-plate, and the felly. The object of this arrangement is to enable the tire to be tightened with merely the detaching of the projection and the placing of a shorter or a longer one above the felly-plate $a'$ instead of having the plate $a'$ with a rigid projection. This enables me to merely change the projection instead of the whole plate, as will be understood. Also the tire is provided with an oblong opening $d'$, and bolts having oblong outer ends $e'$ are provided for the adjustment to hold the tire in place against the opposite edges of the projections $b'$. The object of the oblong opening in the tire shown in Fig. 7 is to use round bolts when the tire is first applied; but when the tire becomes loose the projection $b'$ is removed and a smaller projection substituted therefor, and then the oblong bolts are used, which will hold the tire with its ends against the smaller projection $b'$. In this figure the tire is shown in its tightened position. Should the tire become too tight, the tension upon these bolts is released by the drawing device here shown and round bolts will be substituted therefor and a larger projection $b'$ substituted for that shown in Fig. 7 to permit of the lengthening of the tire to relieve the strain upon the wheel consequent to its becoming tight from being wet or for other reasons. In this construction it will be noted that the tire-plate is provided with a projection the same as in the other views of the drawings, it only differing in being detachable rather than rigid with the plate.

Having thus described my invention, what I claim, and desire to secure by Letters Patent, is—

1. A tire-tightener comprising a guide-plate essentially U-shaped, drawing-arms passing between the guide-plate and the tire, the drawing-arms having projections adapted to fit the bolt-holes of the tire, and a screw-bolt adapted to draw the ends of the arms together, substantially as described.

2. A tire-tightener comprising a guide-plate essentially U-shaped, clamping members for holding the guide-plate to the outer side of the tire, pivoted arms passing between the guide-plate and the tire and provided with projections adapted to engage the bolt-holes therein, and means for drawing the ends of the arms together, substantially as described.

3. A tire-tightener comprising a guide-plate essentially U-shaped and provided with a longitudinal opening, clamping members for the guide-plate, pivoted drawing-arms situated between the guide-plate and the tire and provided with projections adapted to enter the bolt-holes in the tire, and means for drawing the free ends of the arms together, substantially as described.

In testimony whereof I have hereunto set my hand in the presence of two subscribing witnesses.

WASHINGTON HAMILTON.

Witnesses:
WRIGHT ADAMS,
Q. A. WEMPLE.